United States Patent
Tominaga et al.

(10) Patent No.: US 12,530,772 B2
(45) Date of Patent: Jan. 20, 2026

(54) MEDICAL IMAGE PROCESSING APPARATUS AND METHOD

(71) Applicant: TERUMO KABUSHIKI KAISHA, Tokyo (JP)

(72) Inventors: Takanori Tominaga, Hadano Kanagawa (JP); Yuki Sakaguchi, Fujisawa Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/622,532

(22) Filed: Mar. 29, 2024

(65) Prior Publication Data

US 2024/0242352 A1    Jul. 18, 2024

Related U.S. Application Data

(63) Continuation of application No. PCT/JP2022/036138, filed on Sep. 28, 2022.

(30) Foreign Application Priority Data

Sep. 30, 2021    (JP) .................................. 2021-161698

(51) Int. Cl.
*G06T 7/00* (2017.01)
*A61B 5/00* (2006.01)
(Continued)

(52) U.S. Cl.
CPC .......... *G06T 7/0012* (2013.01); *A61B 5/0066* (2013.01); *A61B 5/0084* (2013.01);
(Continued)

(58) Field of Classification Search
CPC ......... G06T 7/0012; G06T 2207/10101; G06T 2207/10132; G06T 2207/20081;
(Continued)

(56) References Cited

U.S. PATENT DOCUMENTS 11,744,527 B2 *    9/2023  Scott .................... A61B 8/463
                                                       600/425
11,883,107 B2 *    1/2024  Gopinath ............... A61B 8/466
(Continued)

FOREIGN PATENT DOCUMENTS

JP    2008-512171 A    4/2008
JP    2020-503909 A    2/2020
(Continued)

OTHER PUBLICATIONS

English Translation of International Search Report dated Nov. 1, 2022, mailed in counterpart International Application No. PCT/JP2022/036138, 2 pages.
(Continued)

*Primary Examiner* — Joel Lamprecht
(74) *Attorney, Agent, or Firm* — Kim & Stewart LLP

(57) ABSTRACT

A medical image processing apparatus includes a catheter including a sensor and insertable into a blood vessel, a display, and a processor configured to: control the catheter to acquire tomographic images of the vessel, input the images into a model and acquire information indicating a condition of a part of the blood vessel, generate a histogram of a plaque area ratio in the vessel, acquire a length of a stent to be placed or a lesion to be treated, calculate a threshold for the ratio using the first histogram and the length, generate a graph indicating the ratio at each part of the blood vessel, and control the display to display the graph and the threshold in an overlapping manner.

20 Claims, 14 Drawing Sheets

(51) Int. Cl.
| | |
|---|---|
| *A61B 8/00* | (2006.01) |
| *A61B 8/08* | (2006.01) |
| *A61B 8/12* | (2006.01) |
| *A61B 34/10* | (2016.01) |
| *G16H 50/20* | (2018.01) |
| *A61M 25/01* | (2006.01) |

(52) U.S. Cl.
CPC .............. *A61B 8/0891* (2013.01); *A61B 8/12* (2013.01); *A61B 8/5223* (2013.01); *A61B 34/10* (2016.02); *G16H 50/20* (2018.01); *A61B 2034/107* (2016.02); *A61M 25/0113* (2013.01); *G06T 2207/10101* (2013.01); *G06T 2207/10132* (2013.01); *G06T 2207/20081* (2013.01); *G06T 2207/30096* (2013.01); *G06T 2207/30101* (2013.01)

(58) Field of Classification Search
CPC . G06T 2207/30096; G06T 2207/30101; A61B 5/0066; A61B 5/0084; A61B 8/0891; A61B 8/12; A61B 8/5223; A61B 34/10; A61B 2034/107; A61B 8/4405; A61B 5/02007; A61B 8/085; A61B 1/00; A61B 1/045; A61B 1/313; G16H 50/20; G16H 30/40; A61M 25/0113
See application file for complete search history.

(56) References Cited

U.S. PATENT DOCUMENTS

2005/0107688 A1\* 5/2005 Strommer ............ A61B 5/7475
600/424
2022/0296205 A1\* 9/2022 Kang ..................... G16H 50/30

FOREIGN PATENT DOCUMENTS

| JP | 2020-092816 A | 6/2020 |
| JP | 2021-517034 A | 7/2021 |
| KR | 20210016860 A | 2/2021 |

OTHER PUBLICATIONS

English Translation of Written Opinion dated Nov. 1, 2022, mailed in counterpart International Application No. PCT/JP2022/036138, 3 pages.

\* cited by examiner

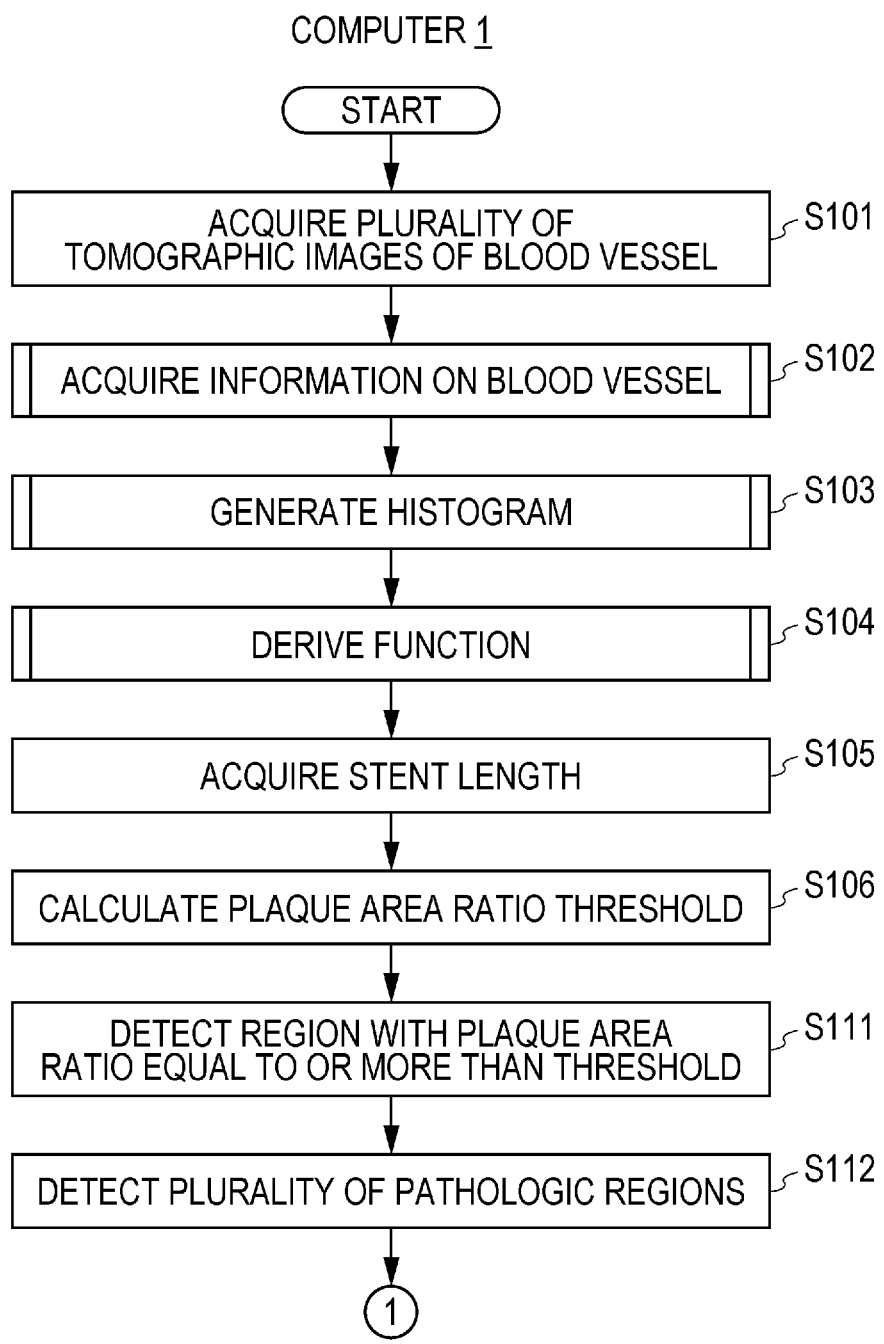

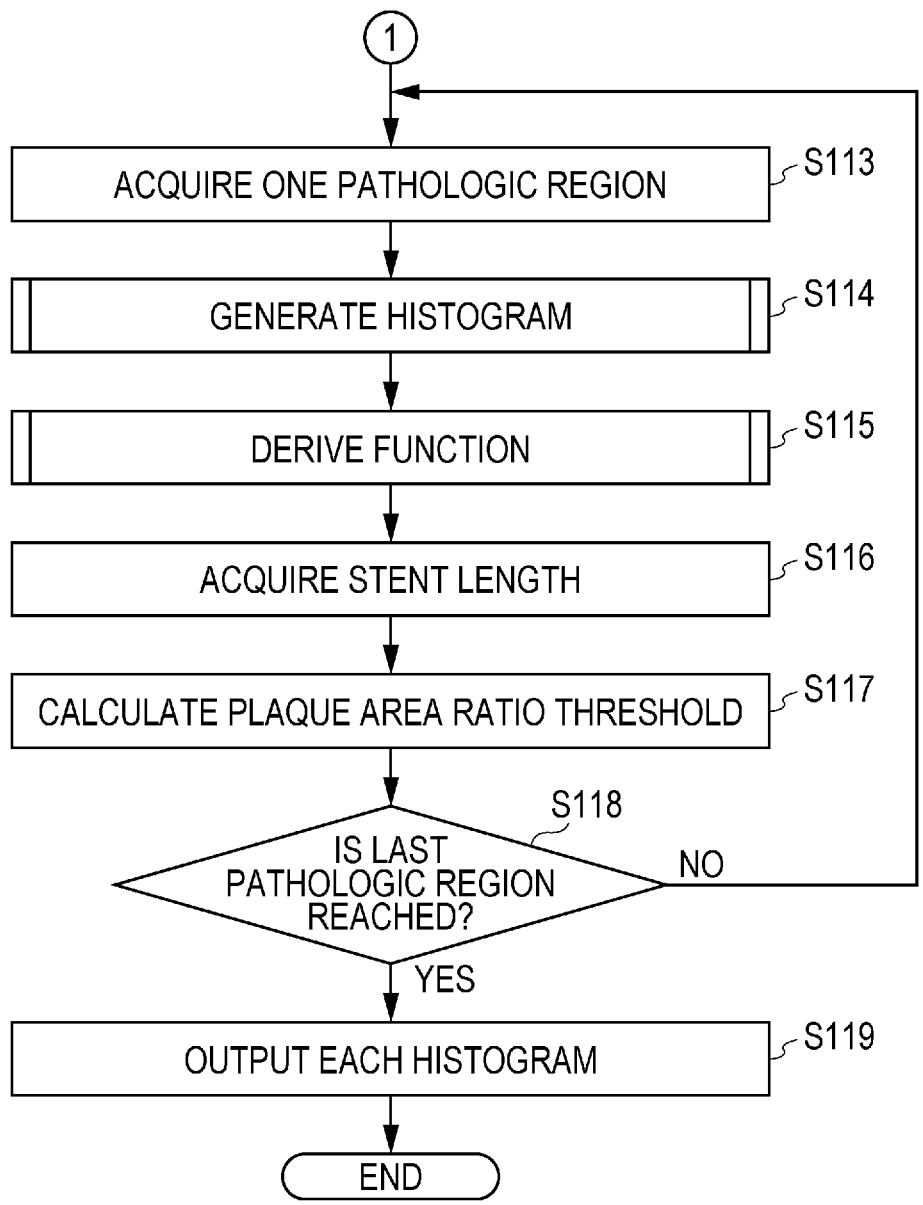

MEDICAL IMAGE PROCESSING APPARATUS AND METHOD

CROSS-REFERENCE TO RELATED APPLICATION

This application is a continuation of International Patent Application No. PCT/JP2022/036138 filed Sep. 28, 2022, which is based upon and claims the benefit of priority from Japanese Patent Application No. 2021-161698, filed Sep. 30, 2021, the entire contents of which are incorporated herein by reference.

BACKGROUND

Technical Field

Embodiments described herein relate generally to a medical image processing apparatus and a method.

Related Art

There is a medical image processing apparatus capable of obtaining spatial information in which a blood vessel of a subject can be visualized, from information acquired in a non-invasive manner.

However, it is difficult for the conventional medical image processing apparatus to assist in determining the location of a stent to be placed in the blood vessel.

SUMMARY

Embodiments of this disclosure provide a medical image processing apparatus and a method that can assist in determining the location of a stent to be placed in a blood vessel.

A medical image processing apparatus according to one embodiment comprises a catheter including a sensor and insertable into a blood vessel; a display; and a processor configured to: control the catheter to acquire a plurality of tomographic images of the blood vessel when the catheter is inserted into the blood vessel and moved along a longitudinal direction thereof, input the acquired images into a learning model and acquire information indicating a condition of a part of the blood vessel corresponding to each of the images, generate a first histogram of a plaque area ratio in the blood vessel based on the acquired information, acquire a length of a stent to be placed in the blood vessel or a length of a lesion to be treated in the blood vessel, calculate a threshold for the plaque area ratio using the first histogram and the length of the stent or the lesion, generate a graph indicating the plaque area ratio at each part of the blood vessel, and control the display to display the graph and the threshold in an overlapping manner.

BRIEF DESCRIPTION OF DRAWINGS

FIG. 14 is a flowchart illustrating a procedure by which a histogram of a plaque area ratio is generated for each lesion region.

FIG. 15 is a flowchart illustrating a procedure by which a histogram of a plaque area ratio is generated for each lesion region.

DETAILED DESCRIPTION

Hereinafter, embodiments of the present invention will be described in detail with reference to the drawings illustrating embodiments thereof.

First Embodiment

A first embodiment relates to a mode of outputting a threshold of a plaque area ratio (i.e., a plaque burden) in a blood vessel on the basis of a tomographic image of a blood vessel generated using an image diagnosis catheter inserted into the blood vessel. It is necessary to determine the placement position of a stent when the image diagnosis catheter is inserted into a lumen organ such as a blood vessel and the lesion is treated. On the basis of the determined placement position, the size of the stent can be determined. The placement position of the stent is determined on the basis of the plaque area ratio. However, for a lesion in clinical practice, it is difficult to determine the placement position of the stent even with reference to the plaque area ratio. In the present embodiment, the optimum placement position of the stent can be determined using the plaque area ratio threshold. The plaque area ratio threshold will be described later.

Figure 1:
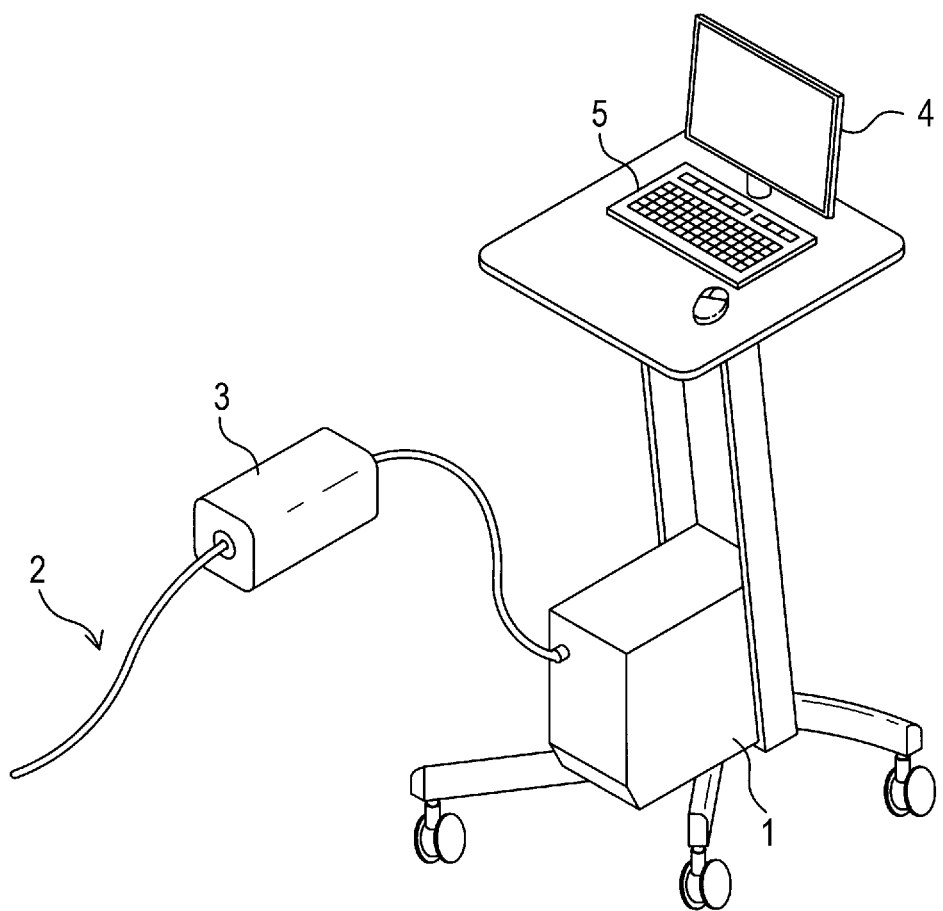
FIG. 1 is a diagram illustrating an outline of a catheter system.

FIG. 1 is a diagram illustrating an outline of a catheter system 10. The catheter system 10 of the present embodiment includes an information processing apparatus 1, an image diagnosis catheter 2, and a motor drive unit (MDU) 3. The image diagnosis catheter 2 is connected to the information processing apparatus 1 via the MDU 3.

The image diagnosis catheter 2 may be an image diagnosis catheter for IVUS (intravascular ultrasound) used for generating an ultrasonic tomographic image from the inside of a blood vessel, e.g., an image diagnosis catheter for generating an ultrasonic tomographic image, a catheter for generating an optical tomographic image such as for optical coherence tomography (OCT) or optical frequency domain imaging (OFDI) that generates an optical tomographic image using near infrared light, or the like. Hereinafter, for the sake of brevity, the image diagnosis catheter 2 is referred to as the catheter 2.

A display 4 and an input device 5 are connected to the information processing apparatus 1. The input device 5 is, for example, a keyboard, a mouse, a trackball, or a microphone. The display 4 is a liquid crystal display (LCD), an organic electroluminescence (EL) display, or the like, and displays an image, information, and the like output from the information processing apparatus 1. The display 4 and the input device 5 may integrated into a touch display having a touch panel. The input device 5 and the information processing apparatus 1 may be integrated into a single apparatus.

The information processing apparatus 1 according to the present embodiment acquires a plurality of tomographic images of a blood vessel generated using the catheter 2 inserted into the blood vessel. The information processing apparatus 1 inputs each of the acquired tomographic images of the blood vessel information output model 171 to be described later, and acquires information on the blood vessel corresponding to each of the tomographic images of the blood vessel.

The information processing apparatus 1 generates a histogram of the plaque area ratio in the blood vessel on the basis of the output information on the blood vessel corresponding to each of the tomographic images of the blood vessel. The information processing apparatus 1 acquires the length of a stent to be placed or the length of a lesion in the blood vessel. The information processing apparatus 1 calculates a plaque area ratio threshold on the basis of the relationship between the generated histogram and the acquired stent length or lesion length. The information processing apparatus 1 outputs the calculated plaque area ratio threshold on a graph showing the relationship between a longer axis position and the plaque area ratio.

Figure 2:
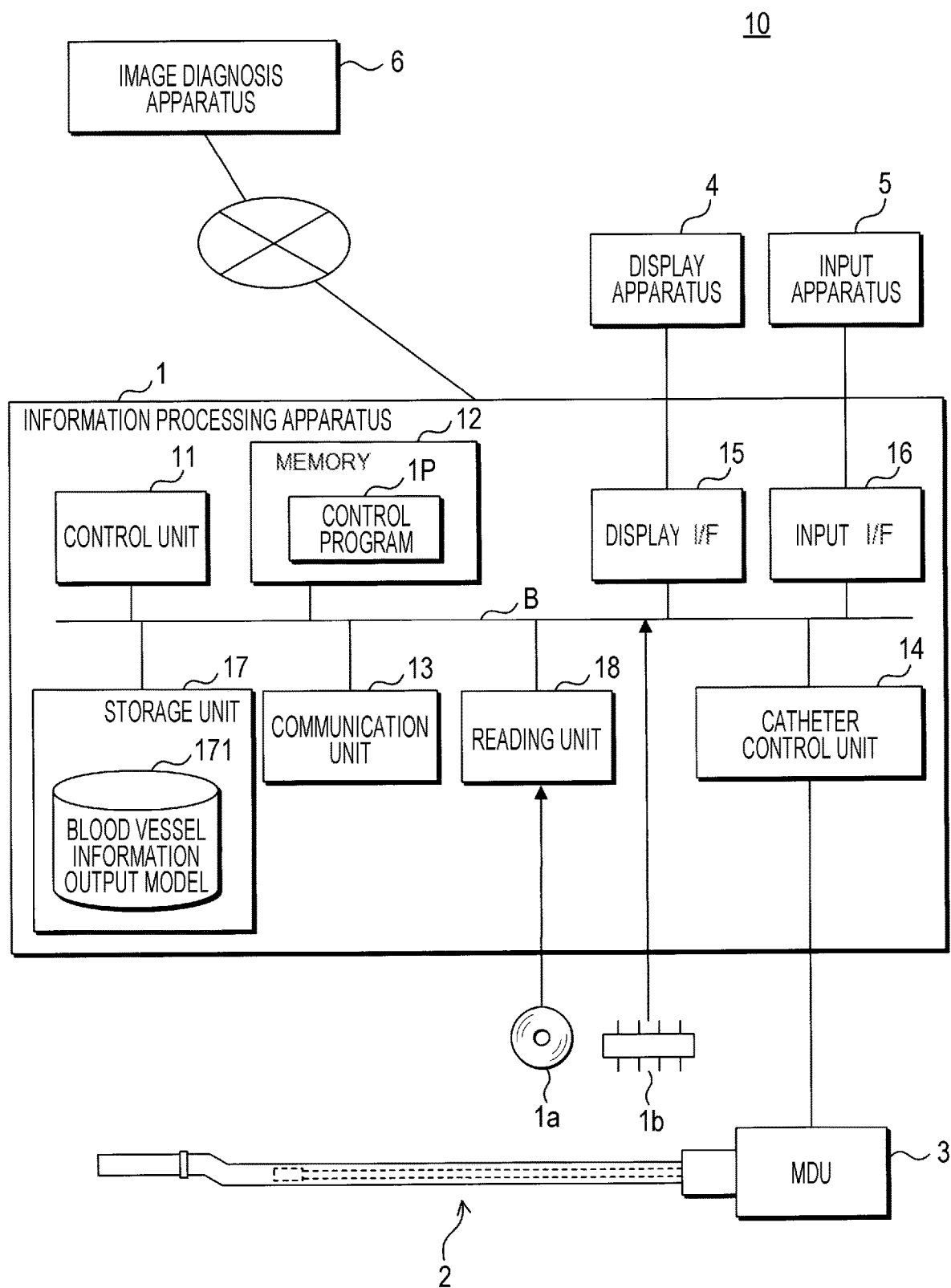
FIG. 2 is a diagram for explaining a configuration of the catheter system.

FIG. 2 is a diagram for explaining a configuration of the catheter system 10. As described above, the catheter system 10 includes the information processing apparatus 1, the catheter 2, and the MDU 3. For example, the information processing apparatus 1 is a dedicated ultrasonic diagnostic apparatus. The information processing apparatus 1 may be any type of apparatus having the function of such an ultrasonic diagnostic apparatus. The information processing apparatus 1 can be a mobile device. The information processing apparatus 1 is connected to various image diagnosis apparatuses 6 such as an X-ray angiography apparatus, an X-ray computed blood vessel tomography (CT) apparatus, a magnetic resonance imaging (MRI) apparatus, a positron emission tomography (PET) apparatus, or an ultrasonic diagnostic apparatus via a hospital information system (HIS) or the like. The information processing apparatus 1 can acquire data or information necessary for performing its functions from such image diagnosis apparatuses 6 and transmit any generated data or information as described below to the image diagnosis apparatuses 6.

The information processing apparatus 1 includes a control unit or controller 11, a memory 12, a communication unit 13, a catheter control unit 14, a display interface (I/F) 15, an input interface (I/F) 16, a storage unit 17, and a reading unit 18. The respective components are connected by a bus B.

The control unit 11 includes an arithmetic processing unit such as a central processing unit (CPU), a micro-processing unit (MPU), or a graphics processing unit (GPU), and reads and executes a control program 1P stored in the memory 12 to perform various information processing, control processing, and the like. In FIG. 2, the control unit 11 is described as a single component, but may include multiple components (e.g., multiple processors).

The memory 12 includes memory elements such as a random access memory (RAM) and a read only memory (ROM), and stores the control program 1P, data, or the like necessary for the control unit 11 to execute processing. In addition, the memory 12 temporarily stores data and the like necessary for the control unit 11 to execute arithmetic processing.

The communication unit 13 is an interface circuit that performs communication between the information processing apparatus 1 and a network. The catheter control unit 14 is a controller that controls the MDU 3, generates an image based on a sensor signal, and the like. Note that the control unit 11 may perform a function of the catheter control unit 14. The display interface 15 is an interface circuit that connects the display 4 and the bus. The input interface 16 is an interface circuit that connects the input device 5 and the bus.

The storage unit 17 includes a storage device such as a hard disk drive (HDD) or a solid state drive (SSD). The storage unit 17 stores the blood vessel information output model 171. The blood vessel information output model 171 is an estimator that outputs information on the blood vessel on the basis of a tomographic image of the blood vessel, and is a learned model generated by machine learning.

In the present embodiment, the storage unit 17 may store the control program 1P, and the memory 12 may store the blood vessel information output model 171. Furthermore, the storage unit 17 may include a plurality of storage devices. Furthermore, the storage unit 17 may be an external storage device connected to the information processing apparatus 1.

The reading unit 18 reads a portable storage medium 1a including a compact disc (CD)-ROM or a digital versatile disc (DVD)-ROM. The control unit 11 may read the control program 1P from the portable storage medium 1a via the reading unit 18 and store the control program 1P in the storage unit 17. In addition, the control unit 11 may download the control program 1P from another computer via the network N or the like and store the control program 1P in the storage unit 17. Furthermore, the control unit 11 may read the control program 1P from a semiconductor memory 1b via an interface circuit (not shown).

The MDU 3 rotates a sensor and a shaft of the catheter 2 disposed therein. The catheter control unit 14 generates one image for each rotation of the sensor. The generated image is a lateral tomographic image centering on a probe portion of the catheter 2 and substantially perpendicular to the probe portion. The MDU 3 can also advance and retract while rotating the sensor and the shaft inside the catheter 2. By a pull-back operation of rotating the sensor while pulling the sensor toward the MDU 3 at a constant speed, the catheter control unit 14 continuously generates a plurality of lateral tomographic images substantially perpendicular to the catheter 2 at predetermined intervals.

Subsequently, processing of outputting the plaque area ratio threshold in the blood vessel will be described. First, the information processing apparatus 1 performs segmentation processing on the tomographic image of the blood vessel using the blood vessel information output model 171 to be described later.

Figure 3:
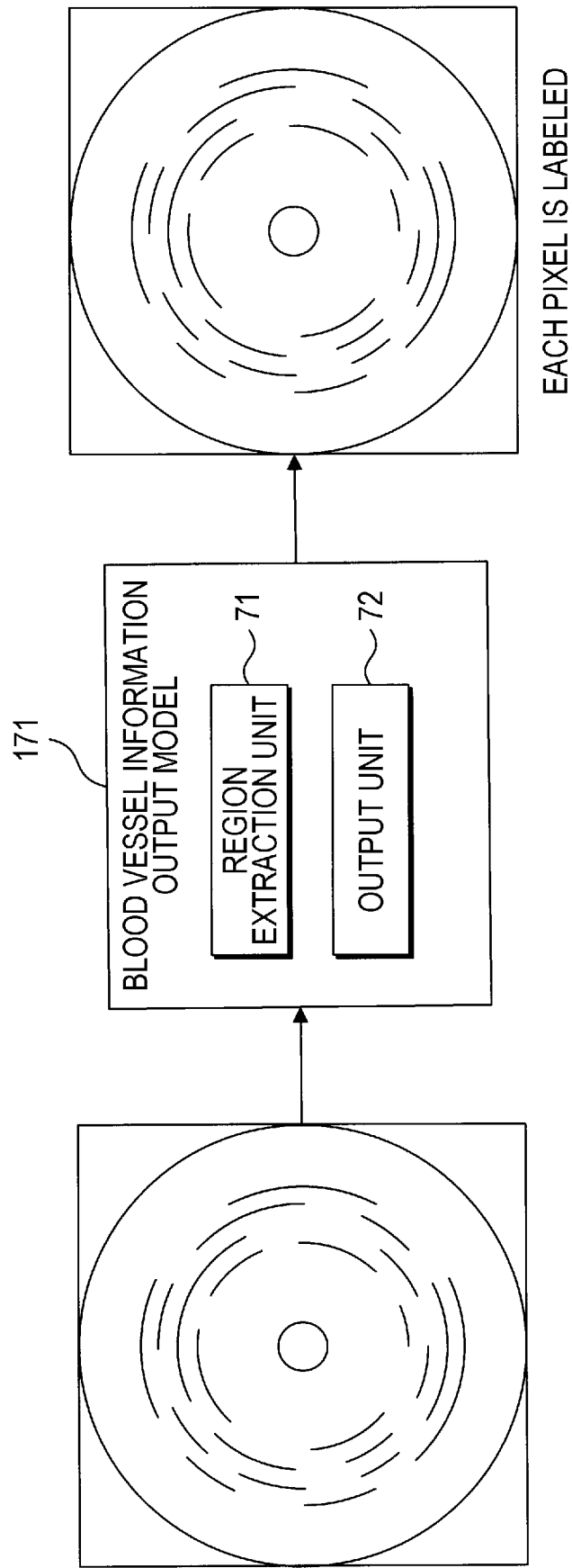
FIG. 3 is a diagram for explaining a blood vessel information output model.

FIG. 3 is a diagram for explaining the blood vessel information output model 171. The blood vessel information output model 171 is used as a program module that is a part of artificial intelligence software. The blood vessel information output model 171 is an estimator that has constructed a neural network in which the tomographic image of the blood vessel is input and a classification result obtained by classifying a region in the tomographic image of the blood vessel is output. The blood vessel information output model 171 is implemented using a segmentation network such as U-Net (Convolutional Networks for Biomedical Image Segmentation). The blood vessel information output model 171 includes a region extraction unit 71 and an output unit 72.

The region extraction unit 71 includes a multilayer encoder layer and a multilayer decoder layer connected thereto. Each encoder layer includes a pooling layer and a convolution layer. By semantic segmentation, each pixel constituting the tomographic image of the input blood vessel is labeled. That is, when the tomographic image of the blood vessel is input to the region extraction unit 71, the region extraction unit 71 labels so as to classify each pixel into a lumen region, a media region, a side branch region, and other regions. The output unit 72 outputs a classification result in which each pixel of the tomographic image of the blood vessel is labeled so as to be classified into the lumen region, the media region, the side branch region, and other regions.

Note that the blood vessel information output model 171 may include a SegNet model, a fully convolutional network (FCN) model, or the like.

Note that the blood vessel information output model 171 is not limited to the segmentation network described above, and may be implemented by other models such as Regions with Convolutional Neural Network (RCNN), Fast RCNN, Faster RCNN, Single Shot Multibook Detector (SSD), You Only Look Once (YOLO), Support Vector Machine (SVM), Bayesian network, Transformer network, regression tree, or random forest.

Next, the information processing apparatus 1 acquires information on the blood vessel on the basis of the classification result output from the blood vessel information output model 171. The information on the blood vessel includes an average lumen diameter, an average vessel diameter, an area, a side branch position or a plaque area ratio. The plaque area ratio (i.e., the plaque burden) is a ratio of the plaque area to the vascular media area corresponding to the blood vessel area, and is expressed by the following Formula (1).

$$\text{Plaque area ratio} = (\text{blood vessel area} - \text{lumen area})/\text{blood vessel area} \quad (1)$$

Specifically, the information processing apparatus 1 inputs the tomographic image of the blood vessel to the blood vessel information output model 171, and outputs the classification result in which each pixel of the tomographic image of the blood vessel is labeled so as to be classified into the lumen region, the media region, the side branch region, and other regions.

For example, the information processing apparatus 1 calculates the lumen area on the basis of the number of pixels of the lumen region output from the blood vessel information output model 171. The information processing apparatus 1 calculates the blood vessel area on the basis of the number of pixels of the media region and the lumen region output from the blood vessel information output model 171. The information processing apparatus 1 calculates the plaque area ratio corresponding to the tomographic image of the blood vessel using the above-described Formula (1) on the basis of the calculated lumen area and blood vessel area.

The information processing apparatus 1 calculates the average lumen diameter and the average blood vessel diameter on the basis of the calculated lumen area and blood vessel area. The average lumen diameter may be calculated by average lumen diameter=$2 \times \sqrt{(\text{lumen area}/\pi)}$ using the lumen area and the circumferential ratio, or may be calculated by average lumen diameter=(minimum lumen diameter+maximum lumen diameter)/2 using the output lumen region, the minimum lumen diameter, and the maximum lumen diameter. Note that the processing of calculating the average blood vessel diameter is similar to the calculation processing of the average lumen diameter, and thus description thereof is omitted.

The information processing apparatus 1 acquires the side branch position (for example, coordinates) on the basis of the side branch region output from the blood vessel information output model 171.

Note that the acquisition processing is not limited to the above-described processing of acquiring the information on the blood vessel. For example, when the tomographic image of the blood vessel is input, the blood vessel information output model 171 that directly outputs information on the blood vessel corresponding to the tomographic image of the blood vessel may be constructed. In this case, the information processing apparatus 1 acquires a plurality of tomographic images of the blood vessel generated using the catheter 2 inserted into the blood vessel. When the tomographic image of the blood vessel is input, the information processing apparatus 1 inputs each of the acquired tomographic images of the blood vessel to the blood vessel information output model 171 learned to output information on the blood vessel, and outputs the information on the blood vessel corresponding to each of the tomographic images of the blood vessel.

Next, processing of calculating the plaque area ratio threshold in the blood vessel on the basis of the information on the blood vessel will be described.

The information processing apparatus 1 acquires a plurality of tomographic images of the blood vessel. The information processing apparatus 1 inputs each of the acquired tomographic images of the blood vessel to the blood vessel information output model 171, and outputs the classification result in which each pixel of the tomographic image of the blood vessel is labeled so as to be classified into the lumen region, the media region, the side branch region, and other regions. On the basis of the output classification result, the information processing apparatus 1 acquires information on the blood vessel corresponding to each of the tomographic images of the blood vessel (e.g., an average lumen diameter, an average vessel diameter, an area, a side branch position or plaque area ratio, etc.). The information processing apparatus 1 generates the histogram of the plaque area ratio in the blood vessel on the basis of the acquired information on the blood vessel.

The histogram is stored in a table format showing the plaque area ratio in the blood vessel as the number of tomographic images (i.e., frequency) of the blood vessel for each grade width (i.e., size of section or granularity) of a predetermined plaque area ratio. The horizontal axis of the histogram represents the plaque area ratio, and the vertical axis represents the number of tomographic images. The grade width is, for example, in 10% increments, in 5% increments, in 1% increments, or the like. The processing of generating the histogram will be described below with reference to FIGS. 4 to 7B.

Figure 4:
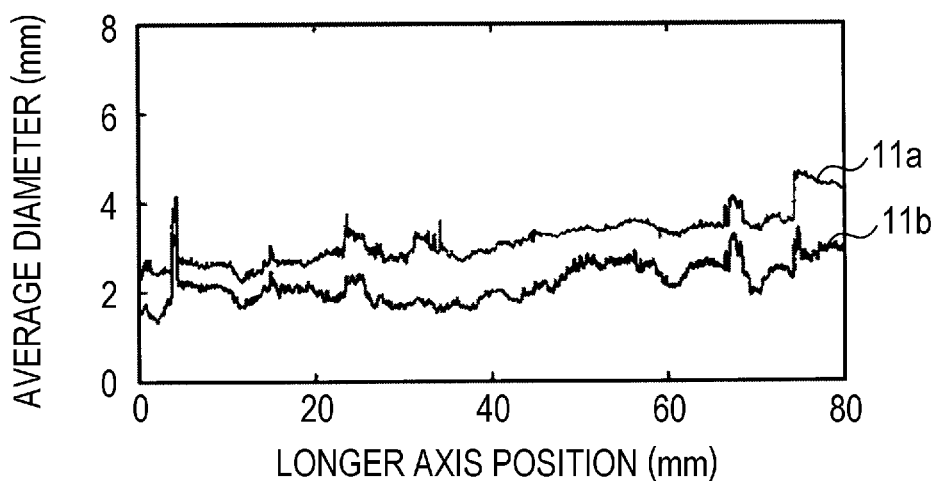
FIG. 4 is a diagram illustrating a graph showing a relationship between an average diameter and a longer axis position of a blood vessel in a tomographic image of a blood vessel.

FIG. 4 is a diagram illustrating a graph showing a relationship between an average diameter and a longer axis position of the blood vessel in the tomographic image of the blood vessel.

The information processing apparatus 1 acquires a plurality of tomographic images of the blood vessel. The information processing apparatus 1 inputs each of the acquired tomographic images of the blood vessel to the blood vessel information output model 171, and acquires information on the blood vessel corresponding to each of the tomographic images of the blood vessel. The information processing apparatus 1 acquires the average lumen diameter and the average blood vessel diameter corresponding to each of the tomographic images of the blood vessel from the output information on the blood vessel. The information processing apparatus 1 generates a graph 91 showing the relationship between the average diameter of the blood vessel and the longer axis position on the basis of the acquired average lumen diameter and average blood vessel diameter. The information processing apparatus 1 outputs the generated graph 91 to the display 4.

The display 4 displays the graph 91 output from the information processing apparatus 1. As illustrated, the horizontal axis of the graph 91 indicates the longer axis position, and the unit is millimeter (mm). The vertical axis of the graph 91 indicates the average diameter (i.e., the average lumen diameter and average blood vessel diameter) of the blood vessel, and the unit is millimeter (mm). A polygonal line 11a indicating the average blood vessel diameter and a polygonal line 11b indicating the average lumen diameter are displayed on the graph 91.

In FIG. 4, the example of the polygonal line graph has been illustrated, but embodiments of the present invention is not limited thereto, and for example, a bar graph or the like may be used. In the present embodiment, the graph 91 illustrates the relationship between the average diameter and the longer axis position of the blood vessel, but generation of the graph 91 is not essential.

Figure 5:
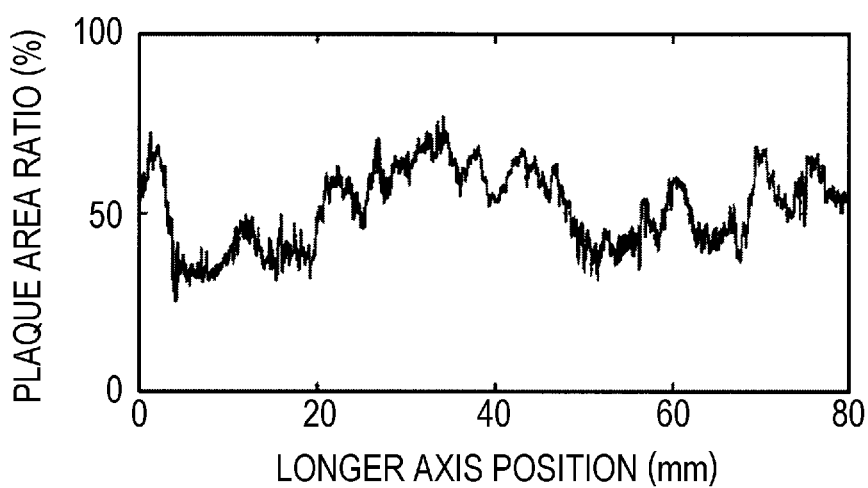
FIG. 5 is a diagram illustrating a graph showing a relationship between a plaque area ratio and a longer axis position of a blood vessel in a tomographic image of the blood vessel.

FIG. 5 is a diagram illustrating a graph showing a relationship between the plaque area ratio and the longer axis position of the blood vessel in the tomographic image of the blood vessel. The information processing apparatus 1 acquires the plaque area ratio corresponding to each of the tomographic images of the blood vessel from the information on the blood vessel output from the blood vessel information output model 171. The information processing apparatus 1 generates a graph 92 showing the relationship between the plaque area ratio and the longer axis position on the basis of the acquired plaque area ratio.

The information processing apparatus 1 displays the generated graph 92 on the display 4. As illustrated, the horizontal axis of the graph 92 indicates the longer axis position, and the unit is millimeter (mm). The vertical axis of the graph 92 indicates the plaque area ratio (%).

Figure 6A:
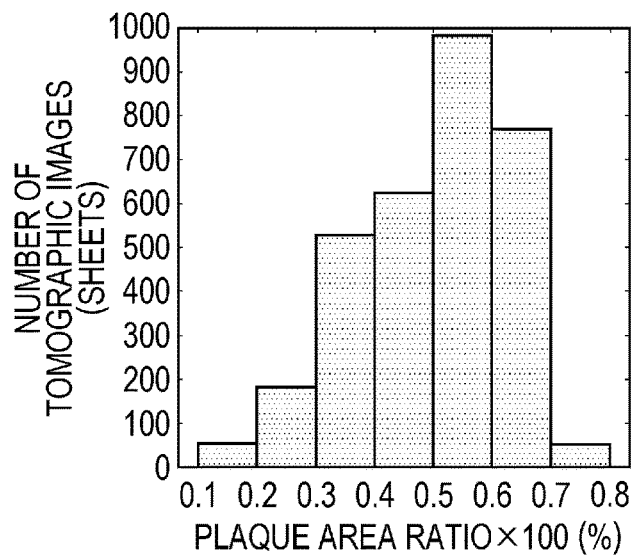
FIG. 6A is a diagram illustrating a histogram of a plaque area ratio.
Figure 6B:
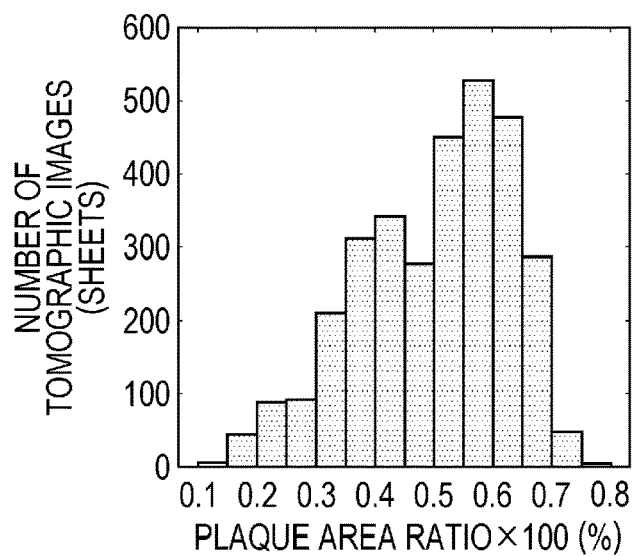
FIG. 6B is a diagram illustrating a histogram of a plaque area ratio.
Figure 6C:
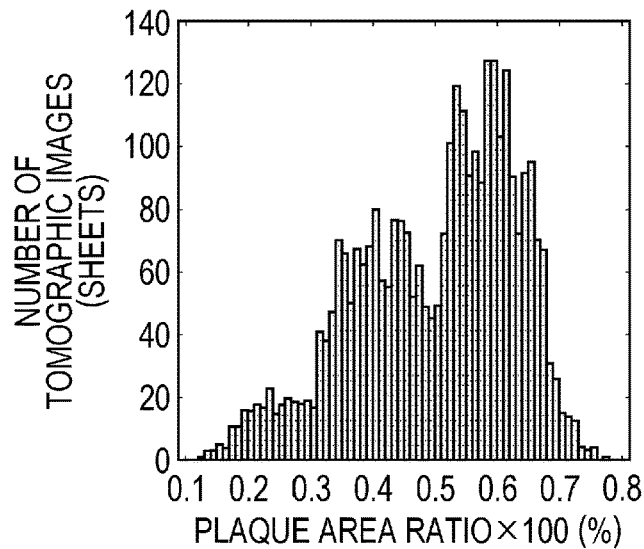
FIG. 6C is a diagram illustrating a histogram of a plaque area ratio.

The information processing apparatus 1 generates, on the basis of the plaque area ratio corresponding to each of the tomographic images of the blood vessel, the histogram of the plaque area ratio in the blood vessel as shown in FIGS. 6A, 6B, and 6C.

FIG. 6A, FIG. 6B, and FIG. 6C are diagrams each illustrating a histogram of the plaque area ratio. FIG. 6A is a diagram illustrating a histogram generated by a first grade width. FIG. 6B is a diagram illustrating a histogram generated by a second grade width. FIG. 6C is a diagram illustrating a histogram generated by a third grade width. Hereinafter, an example in which the first grade width is in 10% increments, the second grade width is in 5% increments, and the third grade width is in 1% increments will be described.

The information processing apparatus 1 acquires the grade width of the plaque area ratio. For example, in a case where the grade width of the plaque area ratio is stored in the memory 12 or the storage unit 17 in advance, the information processing apparatus 1 acquires the grade width from the memory 12 or the storage unit 17. Alternatively, the information processing apparatus 1 may receive an input of the grade width by an operator or the like.

The information processing apparatus 1 generates the histogram of the plaque area ratio on the basis of the plaque area ratio according to the acquired grade width. The information processing apparatus 1 outputs the generated histogram of the plaque area ratio to the display 4. The display 4 displays the histogram of the plaque area ratio output from the information processing apparatus 1. As illustrated, the horizontal axis of the histogram indicates plaque area ratio (%). The vertical axis of the histogram indicates the number of tomographic images of the blood vessel for each grade width of a predetermined plaque area ratio, and the unit is sheet.

In addition, it is possible to perform processing of changing the grade width on the generated histogram of the plaque area ratio. Specifically, the information processing apparatus 1 adds the number of tomographic images (i.e., frequency) in order from the grade on the right side of the histogram. The information processing apparatus 1 calculates the length of a stent to be placed on the basis of the added number of tomographic images. For example, when 30 tomographic images are acquired in a section of 1 mm in the longitudinal direction, 990 tomographic images are acquired in a section of 33 mm in the longitudinal direction. The information processing apparatus 1 determines whether two or more stent lengths are included in the same grade. The stent length includes, for example, 9 mm, 12 mm, 15 mm, 18 mm, 21 mm, 24 mm, 28 mm, 33 mm, 38 mm, or the like. Note that the stent length may be determined according to the manufacturer of the stent designated by the user.

When determining that two or more stent lengths (for example, 21 mm and 24 mm) are included in the same grade, the information processing apparatus 1 changes the grade width to a grade width representing a finer section. For example, the information processing apparatus 1 changes the grade width in 10% increments to the grade width in 5% increments. Note that, regarding the processing of changing the grade width described above, the lesion length may be used instead of the stent length. The information processing apparatus 1 regenerates the histogram of the plaque area ratio on the basis of the plaque area ratio according to the grade width after the change.

Figure 7A:
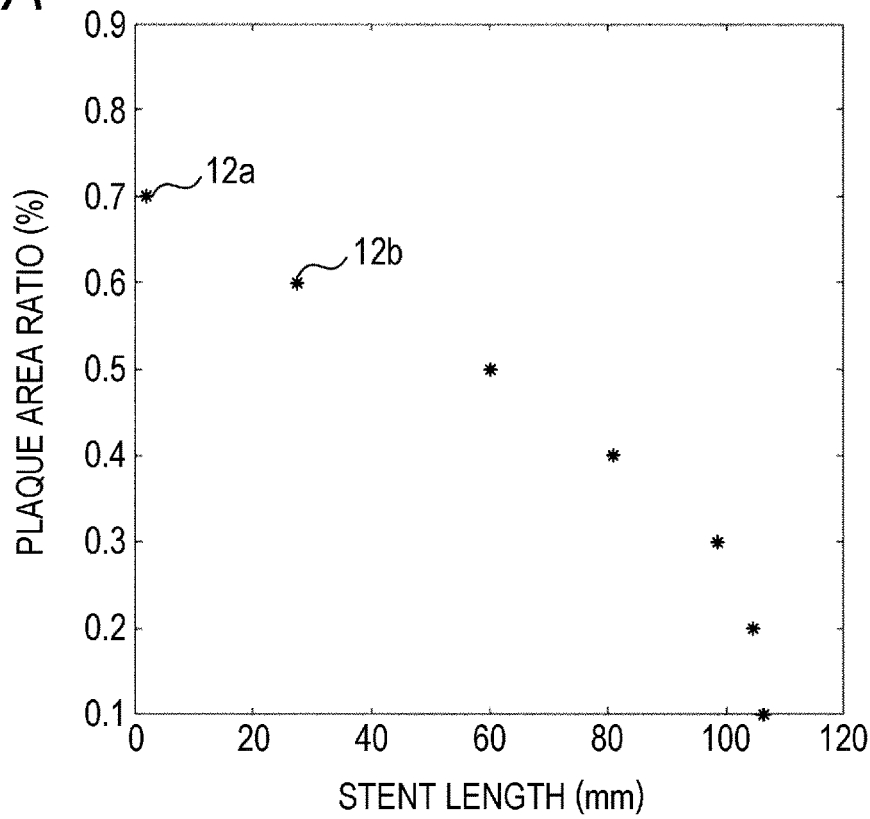
FIG. 7A is a diagram for explaining processing of deriving a function for obtaining a plaque area ratio threshold.
Figure 7B:
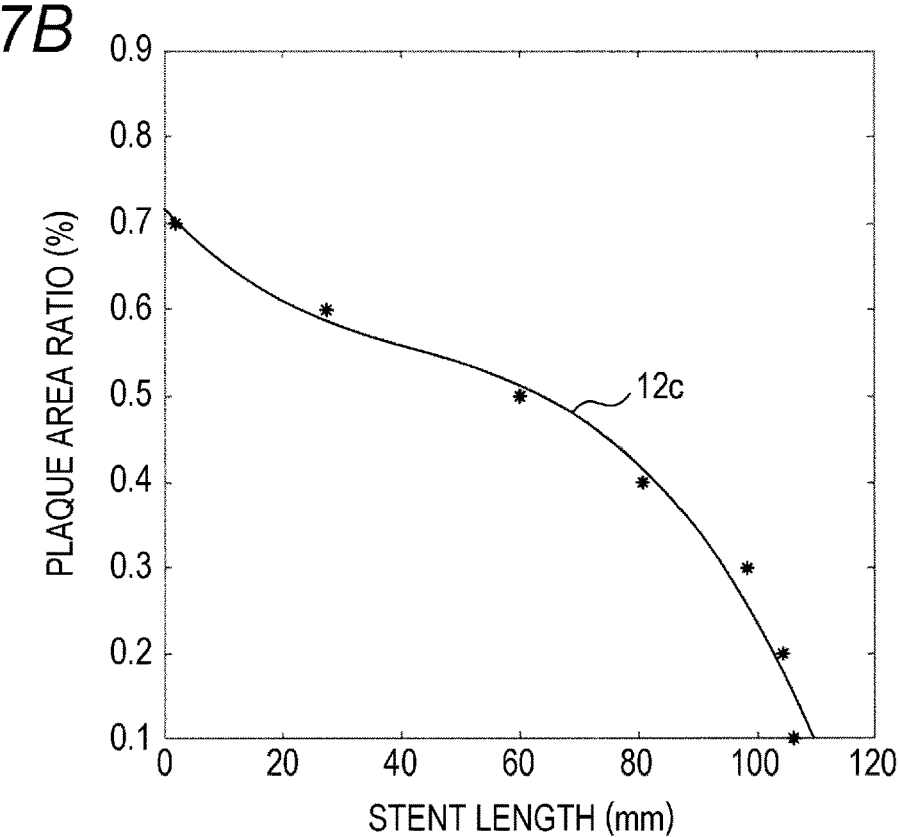
FIG. 7B is a diagram for explaining the processing of deriving a function for obtaining a plaque area ratio threshold.

FIGS. 7A and 7B are diagrams for explaining the processing of deriving a function for obtaining the plaque area ratio threshold. A function for obtaining the plaque area ratio threshold is a function expressing the relationship between the stent length and the plaque area ratio threshold. FIG. 7A is a diagram for explaining processing of calculating sample points according to the grade width. In FIG. 7A, an example in which the grade width is in 10% increments will be described.

The information processing apparatus 1 calculates sample points for generating a regression curve expressing the relationship between the stent length and the plaque area ratio threshold. Those sample points are generated on the basis of the histogram of plaque area ratio as shown in FIG. 6A. Specifically, the information processing apparatus 1 adds the number of tomographic images to the grade width of the plaque area ratio in order from the grade on the right side. The information processing apparatus 1 calculates the longer axis position on the basis of the added number of tomographic images. The information processing apparatus 1 calculates a value of the plaque area ratio corresponding to the calculated longer axis position as a sample point.

For example, the information processing apparatus 1 adds the number of tomographic images corresponding to the grade width of "0.7 to 0.8" on the basis of the histogram of the plaque area ratio illustrated in FIG. 6A. For example, the added number of tomographic images is 50 sheets. The information processing apparatus 1 calculates the longer axis position on the basis of the added number of tomographic images. For example, when 30 sheets of tomographic images are acquired in a section of 1 mm in the longitudinal direction, the added 50 sheets of tomographic images are calculated to be about 1.67 mm in the longitudinal direction. The information processing apparatus 1 calculates a value of the plaque area ratio corresponding to the calculated the longer axis position of 1.67 mm as a sample point. As illustrated, sample points 12a are displayed on the graph.

Alternatively, the information processing apparatus 1 adds the number of tomographic images corresponding to the grade width of "0.6 to 0.7". For example, the added number of tomographic images is 820 sheets. The information processing apparatus 1 calculates the longer axis position on the basis of the added number of tomographic images. For example, when 30 sheets of tomographic images are acquired in a section of 1 mm in the longitudinal direction, the added 820 sheets of tomographic images are calculated to be about 27.33 mm in the longitudinal direction. The information processing apparatus 1 calculates a value of the plaque area ratio corresponding to the calculated longer axis position of 27.33 mm as a sample point. As illustrated, sample points 12b are displayed on the graph.

In this manner, the sample points corresponding to each grade width can be calculated by adding the number of tomographic images in order from the grade on the right side. Note that, in FIG. 7A, the example in which the grade width is in 10% increments has been described, but the present invention can be similarly applied to other grade widths. As the grade width is increased, more sample points are calculated, so that a regression curve with high accuracy can be generated. The regression curve will be described with reference to FIG. 7B.

FIG. 7B is a diagram for explaining the processing of generating a regression curve using sample points. As illustrated, the information processing apparatus 1 calculates a correlation between the stent length and the plaque area ratio threshold using the plurality of calculated sample points as a point sequence, thereby generating an approximate regression curve using, for example, the least squares method. As illustrated, the generated regression curve 12c is displayed on the graph. A function expressing the regression curve can be used to determine the plaque area ratio threshold.

The function expressing the regression curve (i.e., the function for obtaining the plaque area ratio threshold) is expressed by the following Formula (2).

$$\text{Plaque area ratio threshold} = f(\text{stent length}) \quad (2)$$

When the stent length is input to the above-described Formula (2), the information processing apparatus 1 calculates the plaque area ratio threshold. The information processing apparatus 1 outputs the calculated plaque area ratio threshold to the display 4.

Note that, in FIGS. 7A and 7B, the calculation processing of the plaque area ratio threshold with respect to the stent length has been described, but the processing can be similarly applied to the processing of calculating the threshold with respect to the lesion length.

Figure 8:
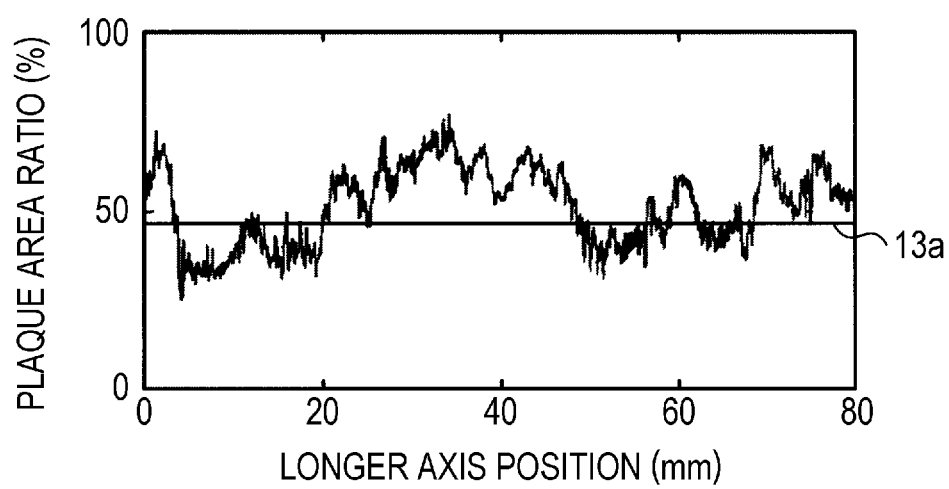
FIG. 8 is a diagram illustrating a screen for displaying a plaque area ratio threshold on a graph.

FIG. 8 is a diagram illustrating a screen for displaying the plaque area ratio threshold on a graph. Note that the same reference signs are given to the same contents as those in FIG. 5, and the description thereof will be omitted. The information processing apparatus 1 calculates the plaque area ratio threshold using the above-described Formula (2). The information processing apparatus 1 outputs the calculated plaque area ratio threshold on the graph 92, and outputs the graph 92 including the plaque area ratio threshold to the display 4. As illustrated, the display 4 displays the graph 92 output from the information processing apparatus 1. In addition, an identification line 13a indicating the plaque area ratio threshold is displayed on the graph 92.

Figure 9:
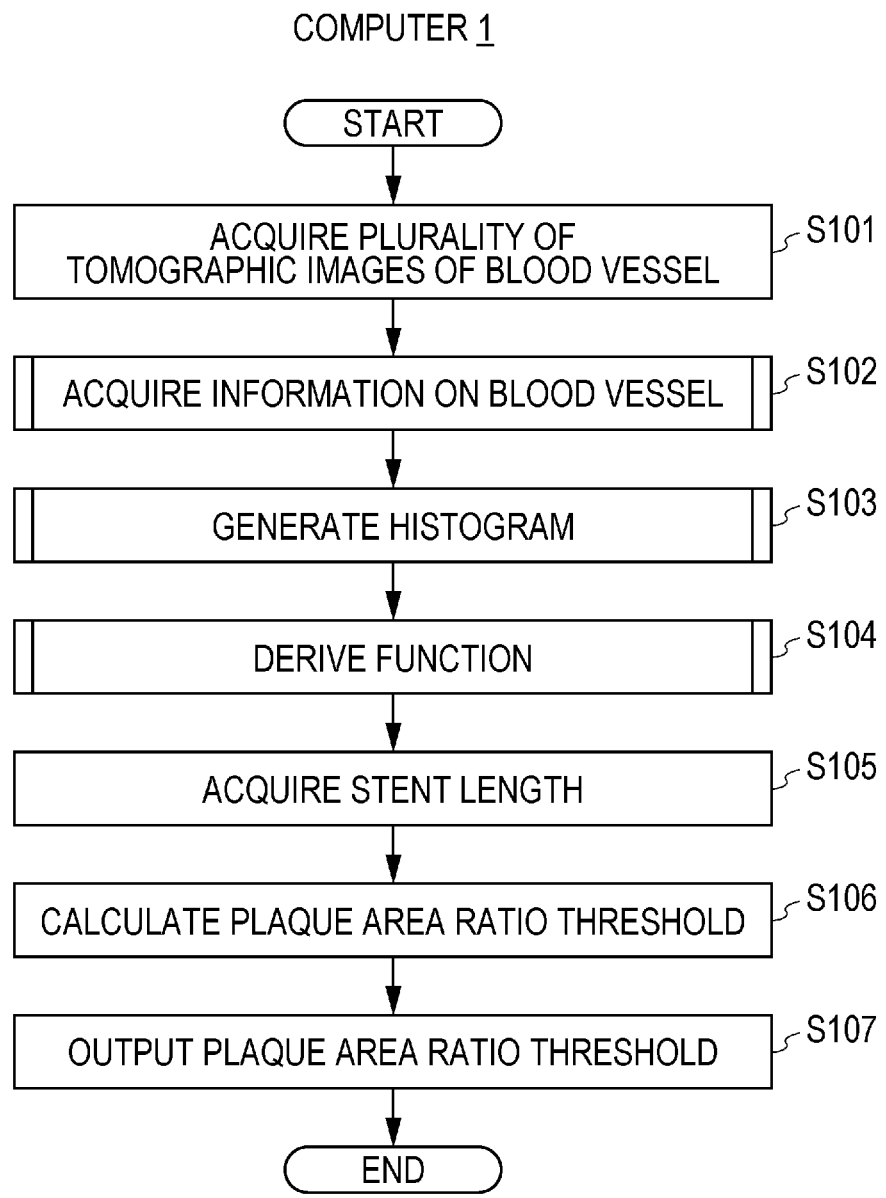
FIG. 9 is a flowchart illustrating a procedure by which a plaque area ratio threshold is output.

FIG. 9 is a flowchart illustrating a procedure by which the plaque area ratio threshold is output. The control unit 11 of the information processing apparatus 1 acquires a plurality of tomographic images of the blood vessel generated using the catheter 2 inserted into the blood vessel from the catheter control unit 14 (S101). The control unit 11 executes a subroutine for acquiring information on the blood vessel using the blood vessel information output model 171 (S102).

The control unit 11 executes a subroutine for generating a histogram of the plaque area ratio (S103). The control unit 11 executes a subroutine for deriving a function for obtaining the plaque area ratio threshold (S104). The subroutines for acquiring the information on the blood vessel, generating the histogram, and deriving a function will be described later.

The control unit 11 acquires the stent length (S105). For example, in a case where the stent length is stored in the memory 12 or the storage unit 17 in advance, the control unit 11 may acquire the stored stent length from the memory 12 or the storage unit 17. Alternatively, the control unit 11 may receive the input of the stent length by the operator or the like from the input device 5 via the input interface 16. Note that the control unit 11 may acquire the lesion length instead of the stent length.

The control unit 11 calculates the plaque area ratio threshold by substituting the acquired stent length (or lesion length) into the derived function (S106). The control unit 11 outputs the calculated plaque area ratio threshold to the display 4 via the display interface 15 (S107). The control unit 11 ends the processing.

Figure 10:
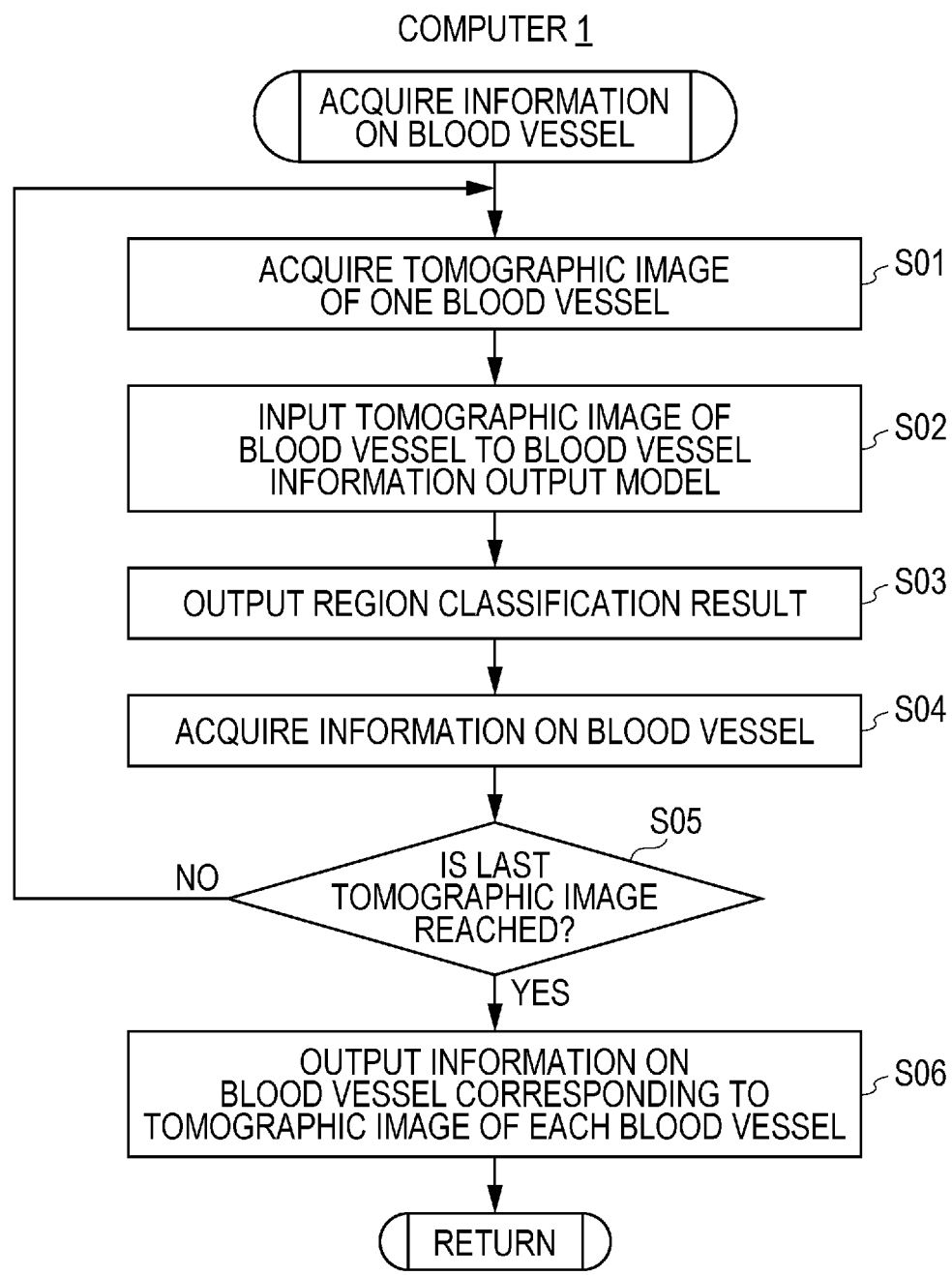
FIG. 10 is a flowchart illustrating a subroutine for acquiring information on a blood vessel.

FIG. 10 is a flowchart illustrating the subroutine for acquiring information on the blood vessel. The control unit 11 acquires one tomographic image of the blood vessel from the plurality of tomographic images of the blood vessel acquired in the processing of S101 (see FIG. 9) (S01). The control unit 11 inputs the acquired tomographic image of the blood vessel to the blood vessel information output model 171 (S02), and outputs the classification result in which each pixel of the tomographic image of the blood vessel is labeled so as to be classified into the lumen region, the media region, the side branch region, and other regions (S03).

The control unit 11 acquires information on the blood vessel on the basis of the output classification result (S04). Information on the blood vessel includes the average lumen diameter, the average vessel diameter, the area including the lumen area and the blood vessel area, a side branch position, or a plaque area ratio.

Specifically, the control unit 11 calculates the lumen area on the basis of the number of pixels of the lumen region output from the blood vessel information output model 171. The control unit 11 calculates the blood vessel area on the basis of the number of pixels of the media region and the lumen region output from the blood vessel information output model 171. The control unit 11 calculates the plaque area ratio corresponding to the tomographic image of the blood vessel using the above-described Formula (1) on the basis of the calculated lumen area and blood vessel area.

The control unit 11 calculates the average lumen diameter and the average blood vessel diameter on the basis of the calculated lumen area and blood vessel area. For example, the control unit 11 calculates the average lumen diameter by the average lumen diameter=2×√(lumen area/π) using the lumen area and the circumferential ratio. The control unit 11 calculates the average blood vessel diameter by the average blood vessel diameter=2×√(blood vessel area/π) using the blood vessel area and the circumferential ratio. The control unit 11 acquires the side branch position (for example, coordinates) on the basis of the side branch region output from the blood vessel information output model 171.

The control unit 11 determines whether the tomographic image of the blood vessel is the last tomographic image among the plurality of tomographic images of the blood vessel (S05). When determining that the tomographic image of the blood vessel is the last tomographic image (YES in S05), the control unit 11 outputs information on the blood vessel corresponding to each of the tomographic images of the blood vessel (S06). The control unit 11 ends the subroutine for acquiring information on the blood vessel. When determining that the tomographic image of the blood vessel is not the last tomographic image (NO in S05), the control unit 11 returns to the processing of S01.

Figure 11:
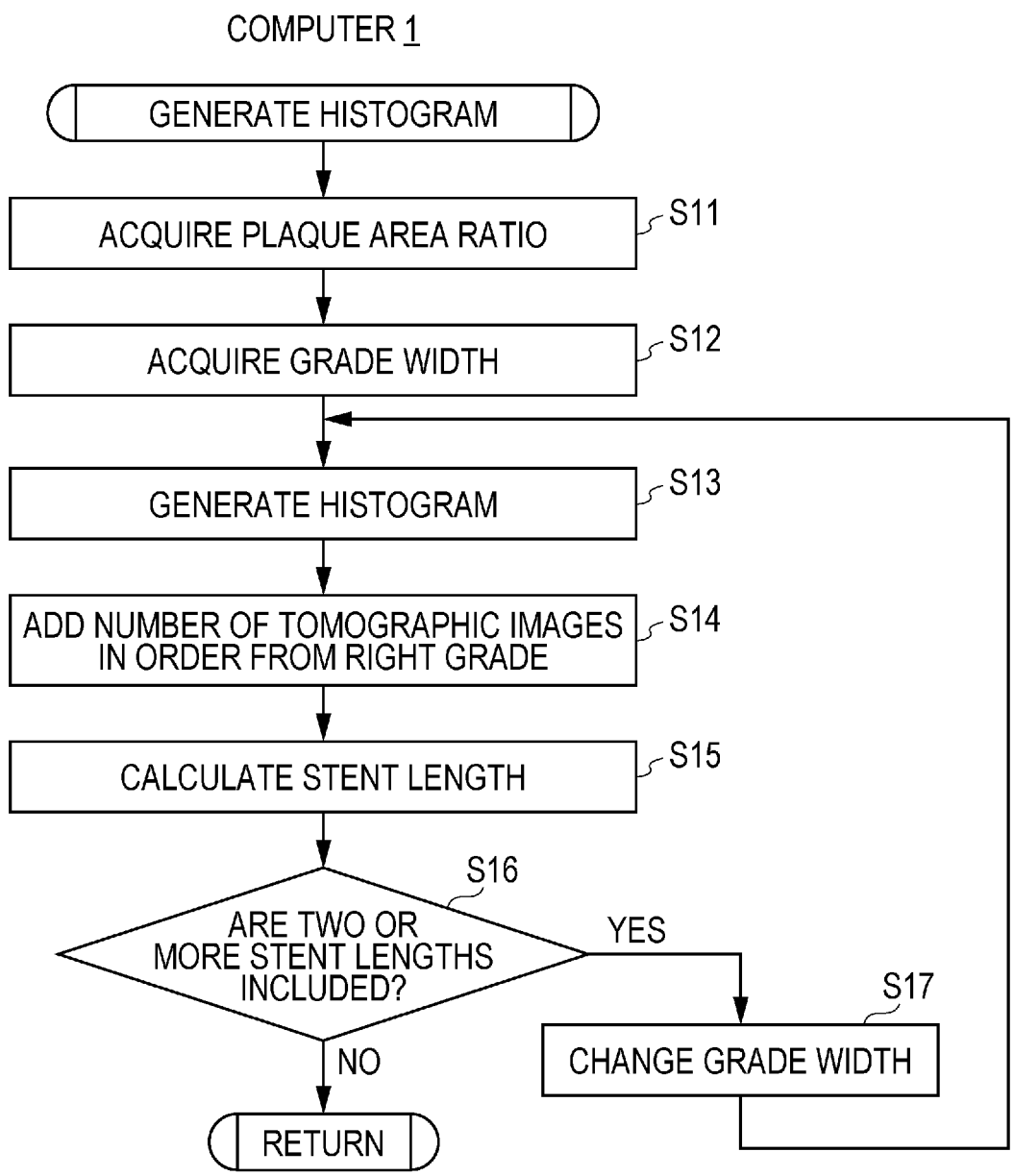
FIG. 11 is a flowchart illustrating a subroutine for generating a histogram of a plaque area ratio.

FIG. 11 is a flowchart illustrating the subroutine for generating a histogram of the plaque area ratio. The control unit 11 of the information processing apparatus 1 acquires the plaque area ratio corresponding to each of the tomographic images of the vessel from the information on the blood vessel output from blood vessel information output model 171 (S11). The control unit 11 acquires the grade width (for example, in 10% increments) of the plaque area ratio stored in advance in the memory 12 (S12). Note that the control unit 11 may receive the setting of the grade width by the input of the operator or the like from the input device 5 via the input interface 16.

The control unit 11 generates the plaque area ratio histogram on the basis of the acquired plaque area ratio in accordance with the acquired grade width (S13). The control unit 11 adds the number of tomographic images in order from the grade on the right side of the histogram (S14). The control unit 11 calculates the stent length on the basis of the added number of tomographic images (S15). For example, when 1 mm corresponds to the number of 30 tomographic images, the number of 990 tomographic images corresponds to about 33 mm.

The control unit 11 determines whether two or more stent lengths (for example, 21 mm and 24 mm) are included in the same grade (S16). When it is determined that two or more stent lengths are not included in the same grade (NO in S16), the control unit 11 ends the subroutine of the histogram generation processing.

When it is determined that two or more stent lengths are included in the same grade (YES in S16), the control unit 11 changes the grade width to a grade width representing a finer section (S17). For example, the control unit 11 may change the grade width in 10% increments to the grade width in 5% increments. The control unit 11 returns to the processing of S13, and regenerates the histogram of the plaque area ratio on the basis of the plaque area ratio according to the grade width after the change.

Figure 12:
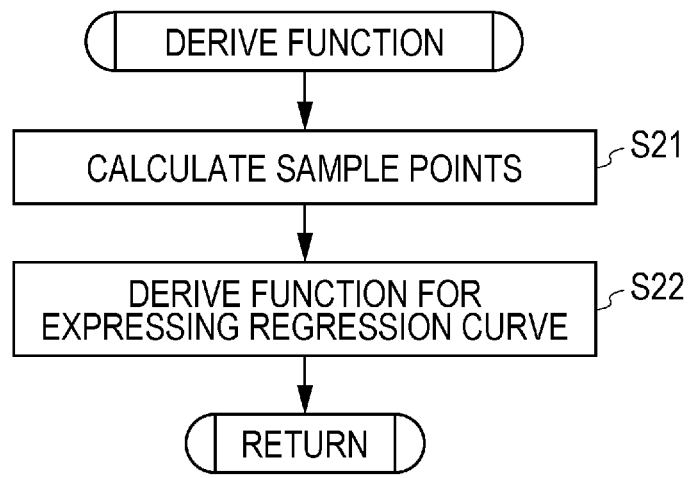
FIG. 12 is a flowchart illustrating a subroutine for deriving a function for obtaining a plaque area ratio threshold.

FIG. 12 is a flowchart illustrating a subroutine for deriving a function of obtaining the plaque area ratio threshold. The control unit 11 calculates sample points for generating a regression curve expressing the relationship between the stent length and the plaque area ratio threshold (S21). Specifically, the control unit 11 adds the number of tomographic images to the grade width of the plaque area ratio in order from the grade on the right side. The information processing apparatus 1 calculates the longer axis position on the basis of the added number of tomographic images. The information processing apparatus 1 calculates a value of the plaque area ratio corresponding to the calculated longer axis position on the graph as a sample point.

The control unit 11 calculates a correlation between the stent length and the plaque area ratio threshold using the plurality of calculated sample points as a point sequence, thereby deriving a function expressing an approximate regression curve using, for example, the least squares method (S22). The control unit 11 ends the subroutine of the processing of deriving a function and performs return.

According to the present embodiment, it is possible to output the plaque area ratio threshold in the blood vessel on the basis of the tomographic image of the blood vessel generated using the catheter 2.

Second Embodiment

A second embodiment relates to a mode for detecting a lesion region on the basis of the plaque area ratio threshold in the blood vessel. Note that description of the same contents as those in the first embodiment will be omitted.

Figure 13:
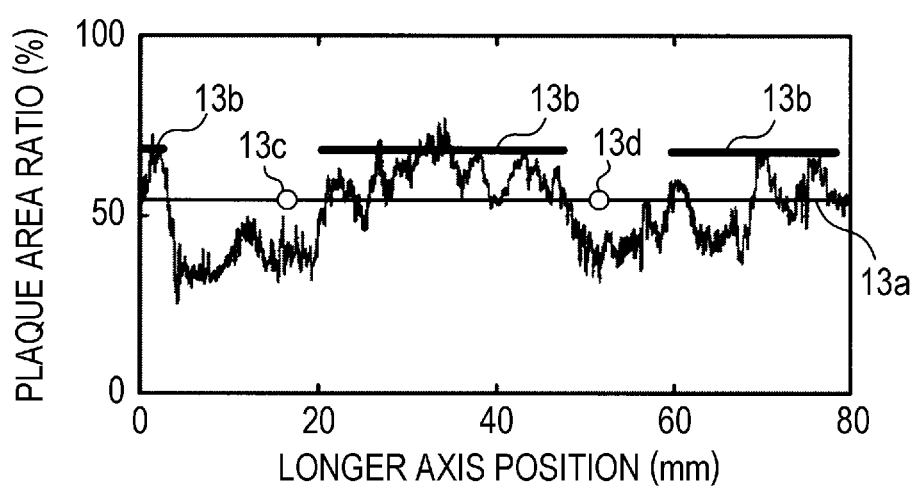
FIG. 13 is a diagram illustrating a graph showing a relationship between a plaque area ratio and a longer axis position in a second embodiment.

FIG. 13 is a diagram illustrating a graph showing a relationship between the plaque area ratio and the longer axis position in the second embodiment. Note that the same reference signs are given to the same contents as those in FIG. 5, and the description thereof will be omitted. The information processing apparatus 1 outputs the plaque area ratio threshold in the blood vessel on the basis of the plurality of tomographic images of the blood vessel. Note that the processing of outputting the plaque area ratio threshold is similar to that in the first embodiment, and thus the description thereof will be omitted.

The information processing apparatus 1 detects a lesion region on the basis of the output plaque area ratio threshold. Specifically, the information processing apparatus 1 detects a region where the plaque area ratio is equal to or larger than the plaque area ratio threshold. The information processing apparatus 1 detects a plurality of lesion regions on the basis of a predetermined distance for each of the lesion regions with respect to the detected region. The predetermined distance for each lesion region is, for example, 3 mm.

The information processing apparatus 1 determines whether a distance (i.e., difference) between values of the plaque area ratio is equal to or less than the predetermined distance for a region where the plaque area ratio is equal to or more than the plaque area ratio threshold. When determining that the distance between the values of the plaque area ratio is equal to or less than the predetermined distance, the information processing apparatus 1 detects the lesion region as the same lesion region. When determining that the distance between the values of the plaque area ratio exceeds the predetermined distance, the information processing apparatus 1 detects the lesion region as a different lesion region. In this manner, the plurality of lesion regions can be detected by a predetermined distance for each of the lesion regions.

The information processing apparatus 1 outputs the plaque area ratio threshold and the plurality of lesion regions on the graph 92. In addition, the information processing apparatus 1 outputs the plurality of lesion regions on the graph 92 so as to distinguish each lesion region in a display mode such as color or pattern, for example. The information processing apparatus 1 outputs the graph 92 to the display 4. The display 4 displays the graph 92 output from the information processing apparatus 1. As illustrated, the identification line 13a indicating the plaque area ratio threshold and the plurality of lesion regions 13b are displayed on the graph 92.

In addition, the placement positions of both ends of the stent can be determined on the basis of the detected lesion regions. Specifically, the information processing apparatus 1 determines the placement positions of both ends of the stent on the basis of the plaque area ratio. The placement positions (i.e., landing zones) at both ends of the stent are preferably normal sites having no plaque. However, when there is no normal site, the placement positions may be a site where the plaque area ratio is equal to or less than a predetermined threshold (for example, 50%), a site where the plaque area ratio is the smallest, or the like.

The information processing apparatus 1 outputs the determined placement positions of both ends of the stent on the graph 92, and outputs the graph 92 to the display 4. The display 4 displays the graph 92 output from the information processing apparatus 1. As illustrated, the stent distal end 13c indicating the distal end of the stent and the stent proximal end 13d indicating the proximal end of the stent are displayed on the graph 92.

FIG. 14 and FIG. 15 are flowcharts each illustrating a procedure by which the histogram of the plaque area ratio is generated for each lesion region. Note that the same reference signs are given to the same contents as those in FIG. 9, and the description thereof will be omitted. After executing the processing of S106, the control unit 11 of the information processing apparatus 1 detects a region where the plaque area ratio is equal to or more than the plaque area ratio threshold (S111). Note that the control unit 11 may use a preset plaque area ratio threshold without executing the processing of S101 to S106.

The control unit 11 detects the plurality of lesion regions on the basis of a predetermined distance (for example, 2 mm) for each of the lesion regions with respect to the detected region (S112). Specifically, the control unit 11 determines whether or not a distance (i.e., difference) between the values of the plaque area ratio is equal to or less than a predetermined distance with respect to the detected region. When determining that the distance between the values of the plaque area ratio is equal to or less than the predetermined distance, the control unit 11 detects the lesion region as the same lesion region. When it is determined that the distance between the values of the plaque area ratio exceeds the predetermined distance, the control unit 11 detects the lesion region as a different lesion region.

The control unit 11 acquires one lesion region from among the plurality of detected lesion regions (S113). The control unit 11 executes a subroutine of the processing of generating a histogram of the plaque area ratio for the acquired lesion region (S114). The control unit 11 executes a subroutine of the processing of deriving a function for obtaining the plaque area ratio threshold for the acquired lesion region (S115). The control unit 11 acquires the stent length from the memory 12 (S116). Note that the control unit 11 may acquire the lesion length instead of the stent length. The control unit 11 calculates the plaque area ratio threshold by substituting the acquired stent length (or lesion length) into the derived function (S117).

The control unit 11 determines whether the lesion region is the last lesion region among the plurality of detected lesion regions (S118). When determining that the lesion region is the last lesion region (YES in S118), the control unit 11 outputs the histogram of the plaque area ratio generated for each lesion region to the display 4 via the display interface 15 (S119). The control unit 11 ends the processing. When it is determined that the lesion region is not the last lesion region (NO in S118), the control unit 11 returns to the processing of S113 and acquires a lesion region next to the lesion region.

According to the present embodiment, it is possible to detect the plurality of lesion regions on the basis of the plaque area ratio threshold.

According to the present embodiment, it is possible to generate the histogram of the plaque area ratio for each lesion region.

According to the present embodiment, it is possible to assist selection of the size of the stent by displaying the plurality of lesion regions on a graph.

Third Embodiment

A third embodiment relates to a mode of generating the histogram of the plaque area ratio corresponding to a target region set designated by the operator or the like on the basis of the target region. Note that description of the same contents as those in the first embodiment and the second embodiment will be omitted.

Figure 16A:
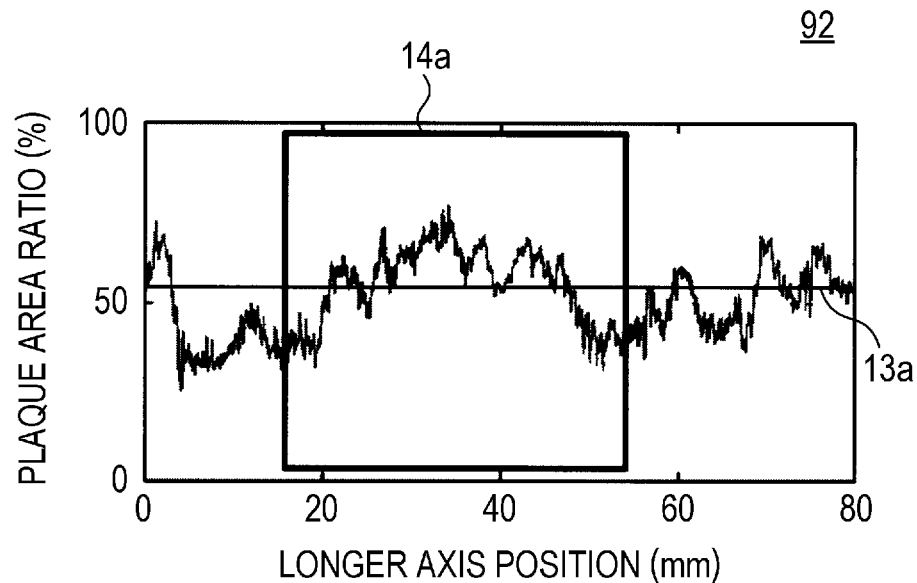
FIG. 16A is a diagram for explaining the process of generating a histogram of a plaque area ratio corresponding to a target region.
Figure 16B:
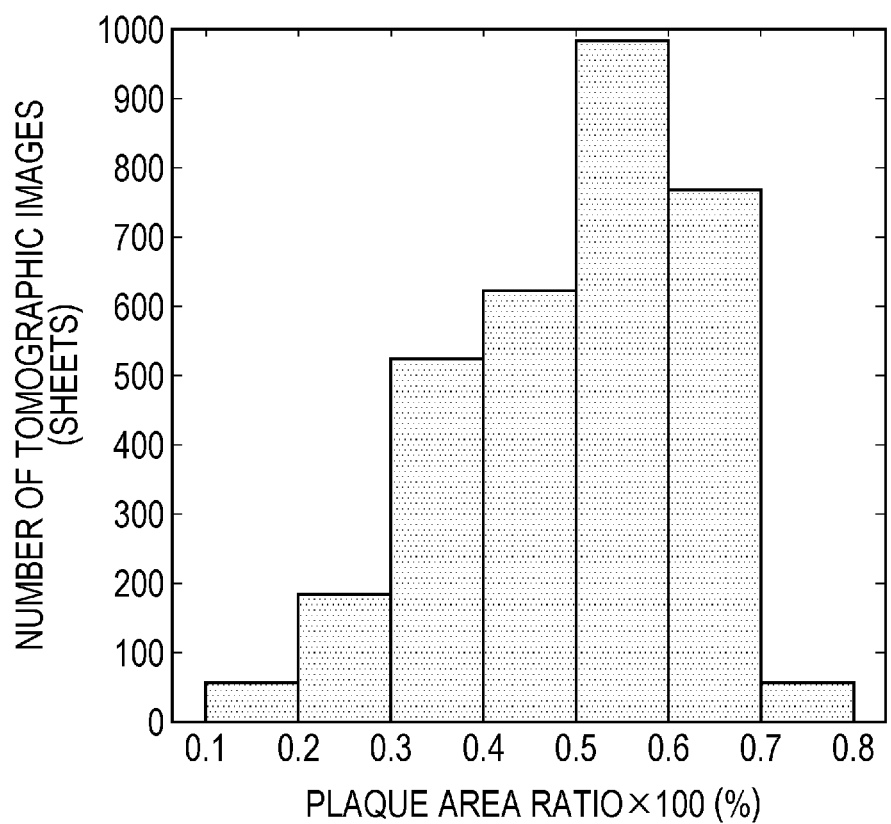
FIG. 16B is a diagram for explaining the processing of generating a histogram of a plaque area ratio corresponding to a target region.

FIG. 16A and FIG. 16B are diagrams for explaining the processing of generating a histogram of the plaque area ratio corresponding to a target region.

FIG. 16A is a diagram illustrating a graph showing a relationship between the plaque area ratio and the longer axis position. Note that the same reference signs are given to the same contents as those in FIG. 13, and the description thereof will be omitted. FIG. 16A includes a region setting field 14a. The region setting field 14a is a field for receiving setting of a target region for generating the histogram.

When receiving the setting operation of the region setting field 14a, the information processing apparatus 1 acquires the set target region. The information processing apparatus 1 generates the histogram of the plaque area ratio corresponding to the acquired target region. Note that the processing of generating the histogram is similar to that of the first embodiment, and thus description thereof is omitted. The information processing apparatus 1 outputs the generated histogram of the plaque area ratio to the display 4. The display 4 displays the histogram of the plaque area ratio output from the information processing apparatus 1.

FIG. 16B is a diagram illustrating an example of the histogram of the plaque area ratio. The histogram illustrated in FIG. 16B is generated on the basis of the target region set by the region setting field 14a in FIG. 16A. Note that the histogram is the same as those in FIGS. 6A, 6B, and 6C, and thus description thereof is omitted. When a plurality of target regions is set in the region setting field 14a, the information processing apparatus 1 generates the histogram of the plaque area ratio for each target region.

According to the present embodiment, it is possible to generate the histogram of the plaque area ratio corresponding to any desired target region.

It is supposed that the embodiments disclosed herein are considered to be an example in all respects and not to be restrictive. The scope of the present invention is indicated not by the above meaning but by the claims and is intended to include all changes within the meaning and scope equivalent to the claims.

What is claimed is:

1. A medical image processing apparatus, comprising:
   a catheter including a sensor and insertable into a blood vessel;
   a display; and
   a processor configured to:
      control the catheter to acquire a plurality of tomographic images of the blood vessel when the catheter is inserted into the blood vessel and moved along a longitudinal direction thereof,
      input the acquired images into a learning model and acquire information indicating a condition of a part of the blood vessel corresponding to each of the images,
      generate a first histogram of a plaque area ratio in the blood vessel based on the acquired information,
      acquire a length of a stent to be placed in the blood vessel or a length of a lesion to be treated in the blood vessel,
      calculate a threshold for the plaque area ratio using the first histogram and the length of the stent or the lesion,
      generate a graph indicating the plaque area ratio at each part of the blood vessel, and
      control the display to display the graph and the threshold in an overlapping manner.

2. The medical image processing apparatus according to claim 1, wherein the processor is configured to:
   determine a part of the blood vessel having a plaque area ratio that is above the threshold as a lesion region at which the stent is to be placed, and
   control the display to display information indicating the lesion region over the graph.

3. The medical image processing apparatus according to claim 1, wherein the processor is configured to:
   determine a plurality of lesion regions in the blood vessel based on the graph and the threshold,
   generate a second histogram of the plaque area ratio for each of the lesion regions, and
   control the display to display the second histogram.

4. The medical image processing apparatus according to claim 1, wherein the processor is configured to derive a function expressing a relationship between the threshold and the length of the stent or the lesion.

5. The medical image processing apparatus according to claim 1, wherein the information includes one of: an average inner diameter of the part of the blood vessel, an average outer diameter of the part of the blood vessel, a cross-sectional area of the part of the blood vessel, and a location of a side branch in the part of the blood vessel.

6. The medical image processing apparatus according to claim 1, wherein the information indicates the plaque area ratio in the part of the blood vessel corresponding to each of the images.

7. The medical image processing apparatus according to claim 1, further comprising:
   an input device through which the length of the stent or the lesion can be input.

8. The medical image processing apparatus according to claim 7, wherein the length of the stent is selected from a plurality of predetermined lengths.

9. The medical image processing apparatus according to claim 1, wherein the catheter is an image diagnosis catheter using intravascular ultrasound (IVUS), optical coherence tomography (OCT), or optical frequency domain imaging (OFDI).

10. The medical image processing apparatus according to claim 1, further comprising:
    a control unit connectable to a motor drive unit for driving the catheter.

11. A method performed by a medical image processing apparatus with a catheter including a sensor and insertable into a blood vessel, the method comprising:
    controlling the catheter to acquire a plurality of tomographic images of the blood vessel when the catheter is inserted into the blood vessel and moved along a longitudinal direction thereof;
    inputting the acquired images into a learning model and acquiring information indicating a condition of a part of the blood vessel corresponding to each of the images;
    generating a first histogram of a plaque area ratio in the blood vessel based on the acquired information;
    acquiring a length of a stent to be placed in the blood vessel or a length of a lesion to be treated in the blood vessel;
    calculating a threshold for the plaque area ratio using the first histogram and the length of the stent or the lesion;
    generating a graph indicating the plaque area ratio at each part of the blood vessel; and
    displaying the graph and the threshold in an overlapping manner.

12. The method according to claim 11, further comprising:
    determining a part of the blood vessel having a plaque area ratio that is above the threshold as a lesion region at which the stent is to be placed; and
    displaying information indicating the lesion region over the graph.

13. The method according to claim 11, further comprising:
    determining a plurality of lesion regions in the blood vessel based on the graph and the threshold;
    generating a second histogram of the plaque area ratio for each of the lesion regions; and
    displaying the second histogram.

14. The method according to claim 11, further comprising:
    deriving a function expressing a relationship between the threshold and the length of the stent or the lesion.

15. The method according to claim 11, wherein the information includes one of: an average inner diameter of the part of the blood vessel, an average outer diameter of the part of the blood vessel, a cross-sectional area of the part of the blood vessel, and a location of a side branch in the part of the blood vessel.

16. The method according to claim 11, wherein the information indicates the plaque area ratio in the part of the blood vessel corresponding to each of the images.

17. The method according to claim 11, further comprising:
receiving an input of the length of the stent or the lesion via an input device.

18. A method for determining a location for a stent to be placed in a blood vessel for treating a lesion therein, the method comprising:
inserting a catheter including a sensor into the blood vessel;
moving the catheter along a longitudinal direction of the blood vessel and operating a medical image processing apparatus connected to the catheter to acquire a plurality of tomographic images of the blood vessel near a vicinity of the lesion, wherein the acquired images are input into a learning model that has been trained to analyze a condition of a blood vessel containing a lesion from images of the blood vessel that are taken near the vicinity of the lesion, and the learning model outputs data indicative of the condition of the blood vessel based on the acquired images that are input into the learning model;
determining the location in the blood vessel where the stent is to be placed based on a graph indicating a plaque area ratio at each part of the blood vessel and a threshold for the plaque area ratio, wherein the graph is generated using the data indicative of the condition of the blood vessel that is output by the learning model, and the part of the blood vessel having a plaque area ratio that is above the threshold is determined as the location in the blood vessel where the stent is to be placed; and
placing the stent at the determined location.

19. The method according to claim 18, further comprising:
determining the threshold based on a length of the stent.

20. The method according to claim 18, further comprising:
determining the threshold based on a length of the lesion.

* * * * *